Patented July 6, 1943

2,323,369

UNITED STATES PATENT OFFICE 2,323,369

METHOD FOR PREVENTING SILVER TARNISH

George F. Briggmann, Bayside, N. Y., assignor to Carbide and Carbon Chemicals Corporation, a corporation of New York No Drawing. Application March 4, 1941, Serial No. 381,669

10 Claims. (Cl. 21—2.5)

The invention relates to a method of preventing the tarnishing of silver, with particular reference to preventing or retarding the surface staining of silverware on storage for exhibition or other purposes.

The ready tendency for surfaces of silver to tarnish and stain on exposure to ordinary atmospheric conditions creates a constant and annoying cleaning problem to those handling, exhibiting and selling silverware products. In display cases, for example, of jewelry and silver stores, it is necessary, for maintaining a bright and lustrous surface, to clean and polish articles of silver at regular intervals, usually within periods of less than a week. This obviously entails substantial expense and trouble to silverware dealers, and there is an immediate and important need for a solution to this situation, which has not heretofore been satisfactorily corrected.

In accordance with the invention a remedy is offered for this problem, and it is an object to provide a means for substantially retarding, or entirely preventing, the formation of tarnish film and stain on surfaces of silverware.

I have found that the vapors of a volatile organic amine, present in the ambient atmosphere, exert an excellent protective action for silver, and in very dilute concentrations in a confined air space will greatly retard, and in some instances entirely prevent, the formation of the brown stain characteristic of silver tarnish. A volatile amine for this purpose includes any of the well known straight-chain heterocyclic or cyclic amine compounds which will vaporize slowly, at normal and ordinary room temperatures. Alkyl and polyalkylamines, such as butylamine, ethylenediamine, and propylenediamine, and heterocyclic amines like morpholine or its derivatives, which have boiling points, either individually or in azeotropic water solutions, ranging from about 75° C. to about 150° C., are especially effective tarnish preventives. As morpholine derivatives there is specifically included the addition or substitution products, such as 2,6 dimethyl morpholine, N-ethyl morpholine, N-methyl morpholine, N-ethoxy ethyl morpholine, and N-vinoxy ethyl morpholine. The morpholine compounds, and other amines of particular preference, are capable of forming aqueous solutions from which both the water and amine evaporate at a rate roughly proportional to their solution concentrations, and this permits a ready means for supplying and controlling the required inhibitor vapor concentration for most effective results.

In practicing the invention it is merely necessary to allow a dilute water solution of the amine to evaporate from a suitable container in a confined space with the silverware. In display cases, for example, a small glass containing the aqueous amine solution can be placed within the case, and by replenishing the liquid as needed, a substantially permanent tarnish protection is afforded. Only very low concentrations of the amine vapor in the confined atmosphere are necessary, as evidenced from tests showing that the vapor from water solutions of from 1% to 5% concentration are entirely suitable, with a preference indicated in the more dilute solutions.

A number of experiments with morpholine as the protective agent show that the most suitable solution concentration for any particular amine can be readily determined by trial. For example, morpholine solutions in water of 33%, 5%, 2.5% and 1% concentrations were placed in small glass containers in the bottom of commercial silverware display cases. All of these solutions for an extended period, of two weeks or more, had entirely prevented formation of the characteristic brown tarnish film, but there was evidence with the higher solution concentration of a light white powdery film on the silver. This white film was, however, much more easily removable, and less objectionable in appearance, than the usual brown tarnish, and with the lower concentrations mentioned, it was just barely detectable after a period of from two to three weeks. It is, therefore, preferable to employ as low an amine concentration as will give complete and satisfactory protection, and for morpholine a 1% water solution is considered to give the best results.

Modifications within the broader scope of the invention will be obvious, particularly with reference to the protective amine selected for any given problem. Such modifications are intended to be included within the scope of the invention as defined by the appended claims.

I claim:

1. A method for protecting silver from tarnish which comprises exposing the silver in a confined space to the vapor of a volatile amine.

2. A method for protecting silver from tarnish which comprises exposing the silver in a confined space to the vapor of a dilute aqueous solution of a volatile amine.

3. A method for protecting silverware from tarnish which comprises exposing the silverware in a confined space to the vapor of an aqueous solution of a volatile amine having a boiling point between about 75° C. and about 150° C.

4. A method for protecting silverware from tarnish which comprises exposing the silverware in a confined space to the vapor of about a 1% to 5% aqueous solution of a volatile amine having a boiling point between about 75° C. and about 150° C.

5. A method for protecting silverware from tarnish which comprises exposing the silverware in a confined space to the vapor of about a 1% to 5% aqueous solution of a volatile amine having a boiling point, in an azeotropic aqueous solution, between about 75° C. and about 150° C.

6. A method for protecting silverware from tarnish which comprises exposing the silverware in a confined space to dilute vapor of an amine of the group consisting of morpholine and water-soluble morpholine addition and substitution products of boiling points, in azeotropic aqueous solutions, between about 75° C. and about 150° C.

7. A method for protecting silverware from tarnish which comprises exposing the silverware in a confined space to the vapor of about a 1% to 5% aqueous solution of an amine of the group consisting of morpholine and water-soluble morpholine addition and substitution products of boiling points, in azeotropic aqueous solutions, between about 75° C. and about 150° C.

8. A method for protecting silverware from tarnish which comprises exposing the silverware in a confined space to the vapor of morpholine.

9. A method for protecting silverware from tarnish which comprises exposing the silverware in a confined space to the vapor of an aqueous solution of morpholine of a concentration from about 1% to 5%.

10. A method for protecting silverware from tarnish which comprises exposing the silverware in a confined space to the vapor of an aqueous solution of morpholine of a concentration of about 1%.

GEORGE F. BRIGGMANN.